(12) United States Patent
Eluru et al.

(10) Patent No.: US 10,889,753 B2
(45) Date of Patent: Jan. 12, 2021

(54) SELF-BREAKABLE TREATMENT FLUIDS FOR USE IN SUBTERRANEAN FORMATION OPERATIONS

(71) Applicant: Halliburton Energy Services, Inc., Houston, TX (US)

(72) Inventors: Sairam Eluru, Pune (IN); Rajender Salla, Pune (IN); Sunil Narasingrao Garaje, Pune (IN); Vijaya Kumar Patnana, Madurwada (IN)

(73) Assignee: Halliburton Energy Services, Inc., Houston, TX (US)

( * ) Notice: Subject to any disclaimer, the term of this patent is extended or adjusted under 35 U.S.C. 154(b) by 26 days.

(21) Appl. No.: 16/089,296

(22) PCT Filed: Apr. 25, 2016

(86) PCT No.: PCT/US2016/029153
§ 371 (c)(1),
(2) Date: Sep. 27, 2018

(87) PCT Pub. No.: WO2017/188922
PCT Pub. Date: Nov. 2, 2017

(65) Prior Publication Data
US 2019/0127629 A1    May 2, 2019

(51) Int. Cl.
*E21B 43/26* (2006.01)
*C09K 8/90* (2006.01)
(Continued)

(52) U.S. Cl.
CPC ............... *C09K 8/90* (2013.01); *C09K 8/665* (2013.01); *C09K 8/68* (2013.01); *C09K 8/685* (2013.01); *C09K 8/706* (2013.01); *C09K 8/80* (2013.01); *C09K 8/88* (2013.01); *C09K 8/887* (2013.01); *E21B 36/00* (2013.01); *E21B 43/26* (2013.01);
(Continued)

(58) Field of Classification Search
None
See application file for complete search history.

(56) References Cited

U.S. PATENT DOCUMENTS

| 4,997,581 A | 3/1991 | Williamson et al. |
| 5,009,267 A | 4/1991 | Williamson et al. |

(Continued)

FOREIGN PATENT DOCUMENTS

| WO | 0151767 A2 | 7/2001 |
| WO | 2010126925 A2 | 11/2010 |
| WO | 2012173537 A1 | 12/2012 |

OTHER PUBLICATIONS

International Search Report and Written Opinion dated Jan. 16, 2017; International PCT Application No. PCT/US2016/029153.

*Primary Examiner* — Andrew Sue-Ako
(74) *Attorney, Agent, or Firm* — McGuireWoods LLP

(57) ABSTRACT

Treatment fluids comprising an aqueous base fluid and a gelling agent of selected from the group consisting of hydroxypropyl starch phosphate, a hydroxypropyl starch phosphate derivative, and any combination thereof. The treatment fluids may be used to perform subterranean formation operations, such as fracturing operations and proppant particulate placement operations. The treatment fluids are self-breakable and provide viscosity for proppant particulate suspension without the use of breakers or crosslinkers.

17 Claims, 9 Drawing Sheets

(51) Int. Cl.
  *C09K 8/88* (2006.01)
  *C09K 8/68* (2006.01)
  *C09K 8/70* (2006.01)
  *C09K 8/66* (2006.01)
  *C09K 8/80* (2006.01)
  *E21B 36/00* (2006.01)

(52) U.S. Cl.
  CPC ...... *C09K 2208/24* (2013.01); *C09K 2208/26* (2013.01)

(56) References Cited

U.S. PATENT DOCUMENTS

| | | | |
|---|---|---|---|
| 5,032,297 A | 7/1991 | Williamson et al. | |
| 2002/0055562 A1* | 5/2002 | Butuc | A61Q 15/00 524/80 |
| 2009/0208443 A1 | 8/2009 | Polonka et al. | |
| 2009/0264321 A1 | 10/2009 | Showalter et al. | |
| 2011/0056752 A1 | 3/2011 | Young et al. | |
| 2015/0344767 A1* | 12/2015 | Lei | C08B 11/20 507/224 |
| 2018/0362830 A1* | 12/2018 | Eluru | E21B 43/04 |
| 2019/0316024 A1* | 10/2019 | Prakash | C09K 8/80 |

* cited by examiner

SELF-BREAKABLE TREATMENT FLUIDS FOR USE IN SUBTERRANEAN FORMATION OPERATIONS

BACKGROUND

The embodiments herein relate generally to subterranean formation operations and, more particularly, to self-breakable treatment fluids for use in subterranean formation operations.

Hydrocarbon producing wells (e.g., oil producing wells, gas producing wells, and the like) are often stimulated by hydraulic fracturing treatments. In traditional hydraulic fracturing treatments, a treatment fluid, which may include particulates entrained therein, is pumped into a portion of a subterranean formation (which may also be referred to herein simply as a "formation") above a fracture gradient sufficient to break down the formation and create one or more fractures therein. The term "treatment fluid," and grammatical variants thereof, as used herein, refers generally to any fluid that may be used in a subterranean formation operation in conjunction with a desired function and/or for a desired purpose. The term "treatment fluid" does not imply any particular action by the fluid or any component thereof. As used herein, the term "fracture gradient," and grammatical variants thereof, refers to a pressure necessary to create or enhance at least one fracture in a particular subterranean formation location, increasing pressure within a formation may be achieved by placing fluid therein at a high flow rate.

Typically, particulate solids are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture." The degree of success of a stimulation operation depends, at least in part, upon the ability of the proppant pack to permit the flow of fluids through the interconnected interstitial spaces between proppant particulates while maintaining open the fracture.

The treatment fluids used to fracture the subterranean formation and/or place proppant particulates therein are typically viscosified. Viscosified treatment fluids generally have a viscosity that is sufficiently high, for example, to suspend the proppant particulates therein for a desired period of time, in addition to preventing undesired leak-off of fluids into a subterranean formation, transferring hydraulic pressure, and the like. Normally, such viscosified treatment fluids comprise a gelling agent that may be crosslinked with crosslinkers to achieve the desired viscosity.

After completing a particular subterranean formation operation using a viscosified treatment fluid (e.g., a fracturing operation or a proppant placement operation), it may be desirable to remove the treatment fluid from the formation to allow for hydrocarbon production. Typically, to remove a viscosified treatment fluid, a breaker is included in the treatment fluid to overtime "break" the treatment fluid into a thin, low-viscosity fluid that can be easily or more easily produced to the surface. In other instances, a breaker may be pumped into the formation to react with the treatment fluid and thereafter cause it to "break." The breaker must then traverse the entire fluid column of the treatment fluid in the wellbore to ensure complete breaking.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
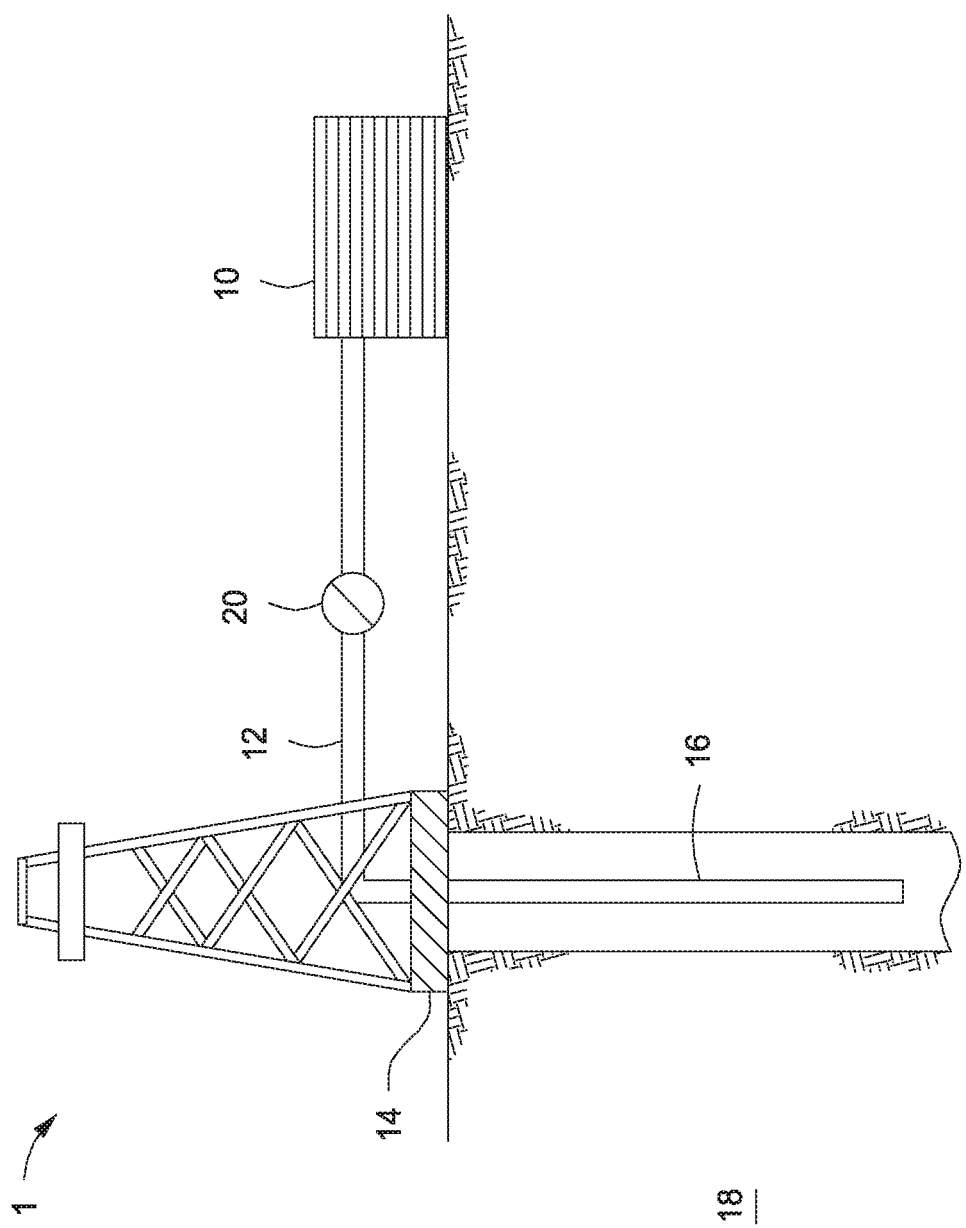
FIG. 1 depicts an embodiment of a system configured for delivering various treatment fluids of the embodiments described herein to a downhole location, according to one or more embodiments of the present disclosure.

The embodiments herein relate generally to subterranean formation operations and, more particularly, to self-breakable treatment fluids for use in subterranean formation operations (which may also be referred to simply as "operations). Even more particularly, the present disclosure relates to self-breakable treatment fluids that have sufficient viscosity to suspend proppant particulates for their placement into formed fractures.

The present disclosure provides a treatment fluid comprising an aqueous base fluid and a gelling agent of hydroxypropyl starch phosphate (HPSP) that is able to be self-breakable, while exhibiting sufficient viscosity to suspend particulates (e.g., proppant particulates). As used herein, the term "self-breakable" refers to a fluid that reduces in viscosity without the addition of a breaker thereto, such as by external environmental factors, like temperature, salt concentration (e.g., the presence or contact with mono-, bi-, or multi-valent metal ions, which may result in chelation with the phosphate functionality of the HPSP), and the like, and any combination thereof. For example, the salt concentration of a treatment fluid can cause an initial increase in viscosity, followed by a faster self-break at similar temperatures to a comparative treatment fluid with a lesser salt concentration (see FIGS. 5 and 6). Accordingly, the combination of temperature and salt concentration can be used to fine tune the self-breaking capability of the treatment fluids described herein, dependent on its particular use and the particular formation in which it is used, for example.

The treatment fluids described herein may be used in one or more subterranean formation operations requiring a viscosified fluid. The treatment fluids of the present disclosure are generally described herein with reference to a hydraulic fracturing operation; however, the treatment fluids may be used in any subterranean formation operation or operation in another industry requiring a viscosified fluid, particularly a self-breakable viscosified fluid. Examples of such subterranean formation operations include those performed during the drilling, completion, and production of a subterranean formation. Examples of treatment fluid types for use in such subterranean formation operations may include, but are not limited to, fracturing fluids, drilling fluids, drill-in fluids, completion fluids, work-over fluids, and the like.

The embodiments of the present disclosure improve hydraulic conductivity and increase production surface area of reservoir rock in subterranean formations (i.e., wellbores in such formations), including conventional formations, as well as in unconventional formations, such as low or ultra-low permeability formations, as described below. The permeability of a formation is a measure of the formation's resistance to through-flow fluid. Thus, low-permeability formations require considerable applied pressure in order to flow fluid through its matrix pore spaces, as compared to formations having conventional, higher permeabilities.

As used herein, the term "conventional formation," and grammatical variants thereof, refers to a formation having a matrix permeability greater than that of a low-permeability formation. As used herein, the term "low-permeability formation," and grammatical variants thereof, refers to a formation that has a matrix permeability of less than 1,000 microdarcy (equivalent to 1 millidarcy). The term "low-permeability formation" encompasses "ultra-low permeability formations," and grammatical variants thereof, which, as used herein, refers to a formation that has a matrix permeability of less than 1 microdarcy (equivalent to 0.001 millidarcy).

Accordingly, the embodiments described herein are applicable to conventional formations or low-permeability formations, such as shale formations, tight-gas formations (e.g., tight-gas sandstone formations), and the like (collectively referred to simply as "subterranean formations" or "formations," regardless of their permeability, unless otherwise specified). Shale reservoirs are sources of hydrocarbons comprising complex, heterogeneous rock with low-permeability. Shale reservoirs may have permeabilities as low as less than about 0.001 millidarcy ("mD") ($9.869233 \times 10^{-19}$ $m^2$), and even as low as less than about 0.0001 mD ($9.869233 \times 10^{-20}$ $m^2$). An example of such a shale reservoir is the Eagle Ford Formation in South Texas, U.S.A. Tight-gas sands are low-permeability formations that produce mainly dry natural gas and may include tight-gas carbonates, tight-gas shales, coal-bed methane, tight sandstones, and the like. Tight-gas sands may have permeabilities as low as less than about 1 mD ($9.869233 \times 10^{-16}$ $m^2$), and even as low as less than about 0.01 mD ($9.869233 \times 10^{-18}$ $m^2$).

Additionally, the embodiments described herein may be employed in subterranean formation operations occurring in wellbores of any configuration, including vertical wellbores, horizontal wellbores, or deviated wellbores (neither vertical, nor horizontal), without departing from the scope of the present disclosure.

Advantageously, the HPSP in the treatment fluids described herein leave little or no residue deposited on a formation (e.g., on or in the pore throats), and thus do not hinder or reduce hydrocarbon production, even in the low-permeability formations described above, which can suffer from such residue with traditional gelling agents. That is, the treatment fluids described herein produce little or no formation damage. They are further able to provide sufficient viscosity to suspend particulates (e.g., proppant particulates) to prevent or reduce sag of such particulates, and exhibit enhanced thermal stability. Moreover, the treatment fluids comprising the HPSP described herein are self-breakable, although inclusion of a breaker is possible, without departing from the scope of the present disclosure, to speed the breaking times, lower the breaking temperature, and the like. For example, the breaking of the treatment fluid can be enhanced at low temperatures by the inclusion of a breaker additive.

The HPSP in the treatment fluids described herein is an inexpensive material that is biodegradable. In some preferred examples the HPSP is a "food grade" material, such that it is environmentally friendly. The HPSP is additionally compatible with traditional gelling agents, where such combination can be optimized to achieve certain desirable results (e.g., viscosity, breakability, environmental protection, and the like). Further optimization can be achieved because the HPSP is compatible with biocides and gel stabilizers, non-emulsifiers, friction reducers, clay control agents, salts (monovalent, bi-valent, and multi-valent), pH control agents, breakers, fluid loss control additives, crosslinkers, and the like, and any combination thereof. Additional additives may also be included in the treatment fluids of the present disclosure, as described below.

As used herein, the term "food grade" refers to materials described in 21 CFR §§ 170-199 (substances approved as food items, approved for contact for food, or approved for use as an additive to food) and combinations that are prepared from such food-grade materials.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

As provided above, the present disclosure provides a treatment fluid comprising an aqueous base fluid and a gelling agent of HPSP. As used herein, the term "HPSP" will be used to refer to any and all forms of HPSP (e.g., derivatives, pre-crosslinked, graft copolymers, and the like) described herein, unless specified otherwise). HPSP may have the molecular formula $C_{44}H_{79}O_{35}P$. The starch used to create the HPSP of the present disclosure may include, but is not limited to, tapioca, corn, barley, spelt, potato, sweet potato, banana, wheat, rice, sago, amaranth, sorghum, waxy maize, waxy tapioca, waxy potato, high amylase starches containing greater than 40% amylase, and the like. Derivatives of HPSP are also suitable for use in the embodiments of the present disclosure. As used herein, the term "derivative," and grammatical variants thereof, refers to a compound that is made from one of a particular compound (e.g., HPSP), for example, by replacing one atom in one of the listed compounds with another atom or group of atoms, ionizing one of the listed compounds, or creating a salt of one of the listed compounds. For example, the HPSP may be an HPSP ester, a sodium HPSP (e.g., sodium hydroxypropyl starch phosphate), and the like. Derivatives may include HPSP that has undergone acylation, alkylation, epoxidization, quaternization, carboxylation, phosphorylation, etherification (e.g., reaction with propylene or ethylene oxide), esterification (e.g., reaction with acetic anhydride), chromophoric group derivation, and the like.

As stated above, the HPSP of the present disclosure may be derivatized with at least one chromophoric group. As used herein, the term "chromophoric group" refers to a chemical group capable of selective light absorption resulting in coloration of the compound in which it is included. In some embodiments, the chromophoric groups used in derivatizing the HPSP for use in the treatment fluids described herein absorb ultraviolet light within the range of about 290 nanometers (nm) to about 400 nm, encompassing any value and subset therebetween. Derivatizing the HPSP with one or more chromophoric groups can be used to monitor the broken treatment fluid at a surface location (e.g., out of the wellbore), such as the amount of broken treatment fluid produced to the surface, by using spectrophotometric analysis.

Examples of suitable chromophoric groups for derivatizing the HPSP described herein include, but are not limited to, p-aminobenzoic acid, salts thereof, and derivatives thereof (e.g., ethyl, isobutyl, glyceryl esters; p-dimethylaminobenzoic acid); anthranilates (e.g., o-aminobenzoates; methyl, menthyl, phenyl, benzyl, phenylethyl, linalyl, terpinyl, and cyclohexenyl esters); salicylates (e.g., octyl, amyl, phenyl, benzyl, menthyl, glyceryl, and dipropyleneglycol esters); cinnamic acid derivatives (e.g., menthyl and benzyl esters, alpha-phenyl cinnamonitrile; butyl cinnamoyl pyruvate); dihydroxycinnamic acid derivatives (e.g., umbelliferone, methylumbelliferone, methylaceto-umbelliferone); trihydroxycinnamic acid derivatives (e.g., esculetin, methylesculetin, daphnetin, and the glucosides, esculin and daphnin); hydrocarbons (e.g., diphenylbutadiene, stilbene); dibenzalacetone; benzalacetophenone; naphtholsulfonates (e.g., sodium salts of 2-naphthol-3,6-disulfonic, 2-naphthol-6,8-disulfonic acids); dihydroxy-naphthoic acid and its salts; o-hydroxybiphenyldisulfonates; p-hydroxybiphenyldisulfonates; coumarin derivatives (e.g., 7-hydroxy, 7-methyl, 3-phenyl); diazoles (e.g., 2-acetyl-3-bromoindazole, phenyl benzoxazole, methyl naphthoxazole, various aryl benzothiazoles); quinine salts (e.g., bisulfate, sulfate, chloride, oleate, and tannate); quinoline derivatives (e.g., 8-hydroxyquinoline salts, 2-phenylquinoline); hydroxy-substituted benzophenones; methoxy-substituted benzophenones; uric acids; vilouric acids; tannic acid and its derivatives (e.g., hexaethylether); butylcarbityl (6-propyl piperonyl) ether; hydroquinone; benzophenones (e.g., oxybenzone, sulisobenzone, dioxybenzone, Benzoresorcinol, 2,2',4,4'-Tetrahydroxybenzophenone, 2,2'-dihydroxy-4,4'-dimethoxybenzophenone, octabenzone); 4-isopropyldibenzoylmethane; butylmethoxydibenzoylmethane; etocrylene; 4-isopropyl-dibenzoylmethane; 2-ethylhexyl p-methoxycinnamate; 4,4'-t-butyl methoxydibenzoylmethane, 2-hydroxy-4-methoxybenzophenone; octyldimethyl p-aminobenzoic acid; digalloyltrioleate; 2,2-dihydroxy-4-methoxybenzophenone; ethyl 4-[bis(hydroxypropyl)]aminobenzoate; 2-ethylhexyl-2-cyano-3,3-diphenylacrylate; 2-ethylhexylsalicylate; glyceryl p-aminobenzoate; 3,3,5-trimethylcyclohexylsalicylate; methylanthranilate; p-dimethylaminobenzoic acid or aminobenzoate; 2-ethylhexyl p-dimethylamino-benzoate; 2-phenylbenzimidazole-5-sulfonic acid; 2-(p-dimethylaminophenyl)-5-sulfoniobenzoxazoic acid, and any combination thereof.

Any of the aforementioned HPSP compounds may, in some embodiments, itself be crosslinked prior to forming a treatment fluid. That is, the HPSP can be "pre-crosslinked" before being combined with the aqueous base fluid and any additional additives (including crosslinkers). These pre-crosslinked HPSP compounds may be crosslinked using inorganic or organic crosslinkers, such as those described below. The use of pre-crosslinked HPSP may, among other things, allow the treatment fluid to reach elevated viscosities compared to non-crosslinked HPSP, allow a reduction in the amount of HPSP required, and/or reduce the use of certain additives, if needed.

Additionally, any of the aforementioned HPSP compounds (including those that are pre-crosslinked) may be used in forming a graft copolymer comprising the HPSP, at least one first ethylenically unsaturated monomer, and at least one second ethylenically unsaturated monomer. The first and second ethylenically unsaturated monomer may include, but are not limited to, acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, muconic acid, 2-acryloxypropionic acid, 2-acrylamido-2-methyl propane sulfonic acid and its sodium salt (AMPS), vinyl sulfonic acid, sodium methallyl sulfonate, sulfonated styrene, (meth)allyloxybenzene sulfonic acid, vinyl phosphonic acid, sodium 1-allyloxy-2-hydroxy propyl sulfonate, salts thereof, and any combination thereof. While the first and second ethylenically unsaturated monomers may be any of those mentioned above, it is to be understood that the selected first and second ethylenically unsaturated monomers must be different in type.

Any of the aforementioned HPSP compounds (e.g., HPSP, derivatives of HPSP, pre-crosslinked, copolymers, and the like) may be additionally grafted onto the surface of one or more nanomaterials to influence fluid properties (e.g., to increase thermal stability, elasticity, and the like). The grafted nanomaterials may additionally be used in combination with any additive described herein, such as a gelling agent. The nanomaterials are nano-sized and may be formed from any appropriately sized material including, for example, silica, cellulose, any described with reference to the proppant particulates below, and the like, and any combination thereof.

The HPSP may be included in the treatment fluids described herein in an amount to impart the desired viscosity to the treatment fluid (alone or in combination with other additives, as discussed below). In some embodiments, the HPSP may be included in the treatment fluids described herein in an amount of about 0.001% to about 20% by weight of the liquid portion of the aqueous base fluid, encompassing any value and subset therebetween. For example, the HPSP may be included in an amount of about 0.001% to about 0.01%, or about 0.01% to about 0.1%, or about 0.1% to about 1%, or about 1% to about 4%, or about 4% to about 8%, or about 8% to about 12%, or about 12% to about 16%, or about 16% to about 20%, 1% to about 18%, or about 3% to about 16%, or about 5% to about 14%, or about 7% to about 12%, or about 9% to about 10% by weight of the liquid portion of the aqueous base fluid, encompassing any value and subset therebetween. The amount of HPSP included in the treatment fluids of the present disclosure depends on a number of factors including, but not limited to, the desired viscosity of the treatment fluid, the temperature at which the treatment fluid is to be used (e.g., the temperature of the subterranean formation into which the treatment fluid will be introduced and affected by), the type of subterranean formation being treated, the salt concentration of the aqueous base fluid forming the treatment fluid, whether the HPSP is pre-crosslinked, any additives in the treatment fluid, and the like, and any combination thereof.

In some embodiments, the amount of HPSP included in the treatment fluids described herein is an amount necessary to achieve a viscosity capable of suspending the proppant particulates, or other solid additives, included in the treatment fluids of the present disclosure. The selection of the HPSP compound and type (e.g., pre-crosslinked, copolymer, grafted, or a combination), additives included in the treatment fluid (e.g., an additional gelling agent), the temperature of the wellbore, and the like will influence the viscosity of a particular treatment fluid.

The aqueous base fluid for use in forming the treatment fluids described herein in combination with the HPSP may be any aqueous fluid that does not adversely interfere with the HPSP, and that is generally suitable for use in a subterranean formation. Examples of suitable aqueous base fluids include, but are not limited to, fresh water, saltwater (e.g., water containing one or more salts dissolved therein), brine (e.g., saturated salt water), seawater, produced water (e.g., water produced as a byproduct of a subterranean formation operation), treated produced water (e.g., produced water treated to remove unwanted constituents), wastewater (e.g., water having anthropogenic influence), treatment wastewater (e.g., wastewater treated to remove unwanted constituents), and the like, any combination thereof.

Indeed, advantageously, the treatment fluids described herein are able to achieve desired viscosities (e.g., for suspending proppant particulates) even in the presence of aqueous base fluids having high salt concentrations, thus enabling the use of the wide range of aqueous base fluids described above (e.g., readily available seawater). For example, in some embodiments, the aqueous base fluid may be deemed a "high salt concentration aqueous base fluid," having a salt concentration greater than about 20% by weight of the liquid portion of the aqueous base fluid (i.e., about 20% by weight of the liquid portion and up to saturation). Alternatively, the aqueous base fluid may have a salt concentration that is less than the salt concentration of a high salt concentration aqueous base fluid, without departing from the scope of the present disclosure, including 0% salt concentration.

Generally, when salt is included in the aqueous base fluids of the treatment fluids described herein, the salt concentration is between about 0.01% to about 35% by weight of the liquid portion of the aqueous base fluid, encompassing any value and subset therebetween. For example, the salt concentration may be in the range of about 0.01% to about 5%, or about 5% to about 10%, or about 10% to about 15%, or about 15% to about 20%, or about 20% to about 25%, or about 25% to about 30%, or about 30% to about 35%, or about 5% to about 30%, or about 10% to about 25%, or about 15% to about 20% by weight of the liquid portion of the aqueous base fluid, encompassing any value and subset therebetween.

Regardless of whether the aqueous base fluid is a high salt concentration aqueous base fluid, examples of suitable salts that may be included therein include, but are not limited to, salts comprising ions of aluminum, boron, barium, calcium, chloride, iron, potassium, magnesium, sodium, strontium, zinc, bromide, sulfate, formate, acetate, nitrate, carbonate, bicarbonate, and any combination thereof. In some embodiments, when the aqueous base fluid comprises salt, at least a portion of the salt comprises one or more divalent salts. For example, in an embodiment, at least about 5% of the salt concentration comprises divalent salt(s), including about 5% to 100%, or about 20% to about 100%, or about 50% to 100%, or about 75% to 100%, or about 20% to 40%, or about 40% to about 60%, or about 60% to about 80%, encompassing any value and subset therebetween. Specific examples of salts that may be included in the aqueous base fluid of the present disclosure may include, but are not limited to, sodium chloride, calcium chloride, calcium potassium chloride, sodium bromide, calcium bromide, bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, and the like, and any combination thereof.

Accordingly, the concentration and type of salt present in a treatment fluid may depend on the source of the aqueous base fluid, and the amount and type of HPSP selected may depend thereon, as well. For example, higher salt concentrations may require an increased concentration of HPSP or a particular derivative of HPSP to achieve the desired viscosity at the desired temperature. Further, the concentration and type of salt present in a treatment fluid may affect its viscosity and/or elasticity, where a low amount of salt has a low viscosity but relatively higher elasticity, but a higher amount of salt initially increases the viscosity (see FIGS. 5 and 6). In other instances, additional additives in the treatment fluid, as described below (e.g., a crosslinker, a non-HPSP gelling agent, and the like), may dictate the type and amount of HPSP alone or in combination with the type of aqueous base fluid to achieve the desired viscosity at the desired temperature.

As described above, the treatment fluids of the present disclosure are self-breakable, such that the viscosity provided by the HPSP (and any additional additives) can be at least partially (or completely) negated to allow the treatment fluid to become a thin fluid that can be produced to the surface and removed from a wellbore (e.g., by breaking long-chain molecules into shorter segments). The treatment fluids, for example, can be efficiently broken due to exposure to external, environmental temperatures, such as the temperature within a wellbore environment. Generally, the treatment fluid described herein is more efficient at self-breaking as environmental temperatures increase. That is, the greater the temperature (e.g., wellbore temperature), the more efficient the self-breaking. At lower temperatures, therefore, a breaker additive may be included to achieve the desired breaking efficiency of the treatment fluids described herein, albeit a lesser amount of breaker additive is required compared to traditional treatment fluids comprising non-HPSP gelling agents. In any event, whether the treatment fluid comprises a breaker additive in addition to the HPSP or the HPSP alone, a treatment fluid is considered "broken" if the viscosity of the treatment fluid is less 10 centipoise (cP), including down to 0 cP, at a shear rate of 511 inverse seconds (1/s), encompassing any value and subset therebetween, upon encountering or exposure to a breaker stimulus (e.g., temperature, a breaker additive, and the like, and any combination thereof. Accordingly, treatment fluids having a viscosity of greater than or equal to 10 cP at 511 1/s are considered un-broken or not fully broken. Suspension of particulates (e.g., proppant) is thus in un-broken fluid, such as, for example, viscosities greater than 100 cP at 511 1/s.

As described in the specific examples below, the treatment fluids of the present disclosure effectively self-break at temperatures of greater than about 115° C. (equivalent to about 240° F.) without the addition of a breaker additive. Accordingly, the self-breaking temperature without the addition of a breaker additive may be in the range of about 115° C. to about 240° C. (or higher), encompassing any value and subset therebetween. For example, the self-breaking temperature without the addition of a breaker may be in the range of about 115° C. to about 140° C., or about 140° C. to about 165° C., or about 165° C. to about 190° C., or about 190° C. to about 215° C., or about 215° C. to about 240° C., or about 135° C. to about 220° C., or about 155° C. to about 200° C., or about 175° C. to about 180° C., encompassing any value and subset therebetween. The self-breaking temperature depends on a number of factors including, but not limited to, the amount and type of HPSP in the treatment fluid, the type of aqueous base fluid, the addition of additives such as crosslinkers, the temperature of the subterranean formation being treated, and the like, and any combination thereof.

In some embodiments, a breaker additive may be included in the treatment fluids of the present disclosure to facilitate breaking the treatment fluid, such as when the treatment fluid will encounter a temperature that is less than that required to self-break the treatment fluid (i.e., having a viscosity of less than 10 cP at 511 1/s). It is to be appreciated, that at any temperature below or above the temperature at which the HPSP self-breaks, a breaker additive may be included to facilitate breaking the fluid. For example in some embodiments, a breaker additive is included in the treatment fluid, and the treatment fluid breaks at a temperature of less than about 115° C. (equivalent to about 240° F.). Moreover, the self-breaking ability of the treatment fluids described herein in combination with a breaker additive may be utilized to formulate a treatment fluid having particular breaking characteristics (e.g., temperature, in the presence of certain additives, and the like).

It is to be appreciated that a breaker additive may be included in the treatment fluids described herein, regardless of the expected breaking (or self-breaking) temperature (e.g., the wellbore temperature), without departing from the scope of the present disclosure, such as to increase breaking time or efficiency. Suitable breaker additives include, but are not limited to, an oxidative breaker, an acid breaker, a delayed release acid breaker, an enzyme breaker (e.g., a delayed release enzyme breaker), a temperature activated breaker, a hydrolysable ester breaker, any encapsulated in an encapsulating material, and any combination thereof.

Examples of oxidative breakers suitable include, but are not limited to, organic peroxides, metal persulfates (e.g., ammonium persulfate, sodium persulfate, and the like), and metal chlorites, bromates, chlorates, hypochlorites, permanganates, and any combination thereof. Examples of acid breakers include, but are not limited to, hydrochloric acid, hydrofluoric acid, hydrobromic acid, hydroiodic acid, sulfuric acid, nitric acid, boric acid, chromic acid, and any combination thereof. Examples of delayed release acid breakers include, but are not limited to, acetic anhydride and organic and inorganic acids such as fumaric acid, benzoic acid, sulfonic acid, phosphoric acids, aliphatic polyesters, poly lactic acid, poly(lactides), polyanhydrides, poly(amino acids), and any combination thereof. Enzyme breakers may be used to catalyze the hydrolysis of glycosidic bonds between the monomer units of polysaccharides in the gel, thus reducing the gel viscosity.

Examples of suitable enzyme breakers include, but are not limited to, alpha and beta amylases, exo- and endo-glucosidases, amyloglucosidase, oligoglucosidase, invertase, maltase, cellulase, hemicellulase, endo-xylanase, exo-xylanase, and any combination thereof. In some embodiments, the enzyme breakers are enzymes or combinations of enzymes that attack the glucosidic linkages of a cellulose gelling agent backbone and degrade the gelling agent into mostly monosaccharide and disaccharide units. Examples of such enzyme breakers include, but are not limited to, cellulase, hemicellulase, endo-glucosidase, exo-glucosidase, exo-xylanase, and any combination thereof. The two most preferred enzyme breakers are exo- and endo-glucosidases. Temperature activated breakers activate by being heated by the subterranean zone in which they are placed, or by another external heat source. Examples of suitable temperature activated breakers include, but are not limited to, alkaline earth metal peroxides, such as calcium peroxide and magnesium peroxide, zinc peroxide and mixtures thereof. Examples of suitable hydrolysable esters include, but are not limited to, sorbitol, catechol, dimethyl glutarate and mixtures of dimethyl glutarate, dimethyl succinate, dimethyl adipate, and any combination thereof.

In some embodiments, the breaker additive may be encapsulated in an encapsulating material, such that the action of the breaker additive is delayed in the wellbore environment.

The encapsulating material, in some embodiments, may be frangible, such that it is removed upon abrasion or shear (e.g., upon closure of a fracture). Alternatively or additionally, the encapsulating material may dissipate in the presence of the aqueous base fluid. As such, the encapsulating material may be removed while suspended in the treatment fluids described herein. Examples of suitable encapsulating materials include, but are not limited to, a salt, barium sulfate, benzoic acid, polyvinyl alcohol, sodium carbonate, sodium bicarbonate, calcium oxide, a degradable polymer, poly (glycolide), poly(e-caprolactone), poly(hydroxybutyrate), poly(anhydride), poly(orthoester), poly(amino acid), poly (ethylene oxide), poly(phosphazene), and any combination thereof.

When included, the breaker is present in the treatment fluids described herein in an amount to achieve a "broken" fluid at the breaking temperature as described above (i.e., having a viscosity of less than 10 cP at 511 1/s), which depends, among other things, on the type and amount of HPSP, the type of aqueous base fluid, the type and amount of any additional additives (e.g., crosslinker), the type of breaker additive, and the like, and any combination thereof. In some embodiments, the breaker additive is included in the treatment fluids described herein in an amount of about 0.01% to about 20% by weight per volume of the gelling agents present therein (i.e., the HPSP and any additional gelling agent additive), encompassing any value and subset therebetween. For example, the breaker additive may be included in the treatment fluids in an amount of about 0.01% to about 1%, or about 1% to about 5%, or about 5% to about 10%, or about 10% to about 15%, or about 15% to about 20%, or about 1% to about 15%, or about 5% to about 10% by weight per volume of the gelling agents present therein, encompassing any value and subset therebetween.

In some embodiments, the treatment fluid further comprises one or more additives in addition to the aqueous base fluid and the HPSP. Some such additives include, but are not limited to, proppant particulates, crosslinkers, gelling agents (i.e., non-HPSP gelling agents), biocides, gel stabilizers, and any combination thereof.

Proppant particulates may be included in any of the treatment fluids of the present disclosure where it is desirable to form a proppant pack within one or more fractures created by the treatment fluid comprising the proppant fluids, or another fluid (which may be one of the treatment fluids described herein, or a different fluid). The material composition, shape, and size of the proppant particulates for use in the treatment fluids described herein may be selected to support the type and size of fracture of the particular formation being fractured. For example, large fractures will require larger proppant particulates, whereas smaller fractures will require smaller proppant particulates and all proppant particulates must be capable of being sufficiently crush-resistant to at least partially withstand fracture closure pressures.

Examples of suitable materials for forming the proppant particulates of the present disclosure may include, but are not limited to, sand, ceramic materials, glass materials, polymer materials (e.g., polystyrene, polyethylene, etc.), nut shell pieces, wood, cements (e.g., Portland cements), fly ash, carbon black powder, silica, alumina, alumino-silicates, fumed carbon, carbon black, graphite, mica, titanium dioxide, barite, meta-silicate, calcium silicate, calcium carbonate, dolomite, nepheline syenite, feldspar, pumice, volcanic material, kaolin, talc, zirconia, boron, shale, clay, sandstone, mineral carbonates, mineral oxide, iron oxide, formation minerals, waste stream sources, man-made materials, low-quality manufactured materials, any of the aforementioned mixed with a resin to form cured resinous particulates, and any combination thereof. As used herein, the term "sand" refers to naturally occurring granular material composed of rock and mineral particulates (e.g., desert sand, beach sand). Nut shells may be from any fruit consisting of a hard or tough shell (encompassing seed and pit shells) including, but not limited to, pecan, walnut, pine, hazelnut, chestnut, acorn, brazil, candlenut, coconut, cashew, pistachio, and the like, and any combination thereof. The term "ceramic material" includes any inorganic crystalline material, compounded of a metal and a non-metal. Examples of suitable ceramics for use as the micro-proppant and/or proppant particulates herein include, but are not limited to, silicon carbide, cordierite, porcelain, alumina porcelain, high-voltage porcelain, lithia porcelain, cordierite refractory, alumina silica refractory, magnesium silicate, steatite, forsterite, titania, tatanate, and any combination thereof.

The shape of the proppant particulates may be of any shape capable of meeting the desired unit mesh size or unit mesh size range, as described below. As used herein, the term "unit mesh size" refers to a size of an object (e.g., a particulate) that is able to pass through a square area having each side thereof equal to a specified numerical value. For example, the proppant particulates may be substantially spherical, fibrous, or polygonal in shape. As used herein, the term "substantially spherical," and grammatical variants thereof, refers to a material that has a morphology that includes spherical geometry and elliptic geometry, including oblong spheres, ovoids, ellipsoids, capsules, and the like and may have surface irregularities. As used herein, the term "fibrous," and grammatical variants thereof, refers to fiber-shaped substances having aspect ratios of greater than about 5 to an unlimited upper limit. The term "polygonal," and grammatical variants thereof, as used herein, refers to shapes having at least two straight sides and angles. Examples of polygonal micro-particulates may include, but are not limited to, a cube, cone, pyramid, cylinder, rectangular prism, cuboid, triangular prism, icosahedron, dodecahedron, octahedron, pentagonal prism, hexagonal prism, hexagonal pyramid, and the like, and any combination thereof.

The proppant particulates of the present disclosure may have a unit mesh particle size in the range of about 1 micrometer ($\mu$m) to about 1680 $\mu$m, encompassing any value and subset therebetween. For example, in some embodiments, the proppant particulates have a unit mesh particle size in the range of about 1 $\mu$m to about 280 $\mu$m, or about 280 $\mu$m to about 560 $\mu$m, or about 560 $\mu$m to about 840 $\mu$m, or about 840 $\mu$m to about 1120 $\mu$m, or about 1120 $\mu$m to about 1400 $\mu$m, or about 1400 $\mu$m to about 1680 $\mu$m, or about 280 $\mu$m to about 1400 $\mu$m, or about 560 $\mu$m to about 1120 $\mu$m, encompassing any value and subset therebetween. In yet other embodiments, the proppant particulates have a unit mesh size of 1680 $\mu$m, or 149 $\mu$m, or 74 $\mu$m, or 63 $\mu$m, or 44 $\mu$m, or 1 $\mu$m, without departing from the scope of the present disclosure. The selected size of the proppant particulates depends on a number of factors including, but not limited to, the type of subterranean formation being treated, the size(s) of the fractures formed therein, the shape(s) of the proppant particulates selected, and the like, and any combination thereof.

Generally, the proppant particulates are included in a treatment fluid of the present disclosure in an amount in the range of about 0.001 pounds per gallon (ppg) to about 10 ppg of the liquid portion of the aqueous base fluid therein, encompassing any value and subset therebetween. For example, the proppant particulates may be included in an amount of about 0.001 ppg to about 0.01 ppg, or about 0.01 ppg to about 0.1 ppg, or about 0.1 ppg to about 1 ppg, or about 1 ppg to about 2 ppg, or about 2 ppg to about 4 ppg, or about 4 ppg to about 6 ppg, or about 6 ppg to about 8 ppg, or about 8 ppg to about 10 ppg, or about 1 ppg to about 9 ppg, or about 2 ppg to about 8 ppg, or about 3 ppg to about 7 ppg, or about 4 ppg to about 6 ppg, encompassing any value and subset therebetween. One (1) ppg is equivalent to 119.96 grams per liter. The concentration of proppant particulates depends on a number of factors including, but not limited to, the type of subterranean formation being treated, the size(s) of the fractures formed therein, the shape of the proppant particulates selected, and the like, and any combination thereof.

A crosslinker additive may be included in any of the treatment fluids described herein to increase the viscosity of the treatment fluid either with the HPSP alone, or with additional gelling agents included. It is to be appreciated, however, that a crosslinker is not necessary to achieve the desired viscosity (e.g., to suspend proppant particulates). The crosslinker(s) may be included in the treatment fluid in an amount to achieve the desired viscosity (with or without an additional non-HPSP gelling agent).

When included in a treatment fluid, the crosslinkers may include, but are not limited to, a borate ion, a metal ion, or similar component that is capable of crosslinking at least two molecules of the gelling agent, whether a HPSP gelling agent or a non-HPSP gelling agent additive, as described in greater detail below. Examples of suitable crosslinkers may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions.

In some embodiments, the crosslinker may be a multifunctional boronic acid crosslinker comprising a copolymer that comprises at least one boronic acid monomer unit and at least one water-soluble monomer unit. The multifunctional boronic acid crosslinker may be a random copolymer. The at least one boronic acid monomer unit may be a polymerizable vinyl, allyl, or acrylic functional group; an aryl, alkyl, alkenyl, or alkynyl boronic acid; and any combination thereof. The at least one water-soluble monomer unit may be selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof. For example, the boronic acid monomer unit may be 3-acrylamidophenyl boronic acid and the water-soluble monomer unit may be an acrylamide (e.g., N,N-dimethylacrylamide). In some embodiments, the ratio of the boronic acid monomer unit(s) to the water-soluble monomer unit(s) is in the range of from about 1:1 to about 1:200, encompassing any value and subset therebetween.

Non-HPSP gelling agent additives may be included in any of the treatment fluids, as described above, to further increase the viscosity of the treatment fluid. It is to be appreciated, however, that a non-HPSP gelling agent is not necessary to achieve the desired viscosity (e.g., to suspend proppant particulates). The non-HPSP gelling agent may be included in the treatment fluid in an amount to achieve the desired viscosity (with or without the addition of a crosslinker(s)). In some embodiments, the non-HPSP gelling agent additive(s) may be included in the treatment fluids in a range of about 0.01% to about 15% by weight per volume of the liquid portion of the aqueous base fluid, encompassing any value and subset therebetween. For example, the non-HPSP gelling agent additive(s) may be included in the range of about 0.01% to about 0.1%, or about 0.1% to about 1%, or about 1% to about 3%, or about 3% to about 6%, or about 6% to about 9%, or about 9% to about 12%, or about 12% to about 15%, or about 1% to about 12%, or about 3% to about 9% by weight per volume of the liquid portion of the aqueous base fluid, encompassing any value and subset therebetween.

Suitable non-HPSP gelling agents (or simply "gelling agents") may include, but are not limited to, a natural polymer, a synthetic polymer, and any combination thereof. Oligomers, including those listed herein, capable of associating to form higher viscosity networks may also be used as the gelling agents, without departing from the scope of the present disclosure, provided that the particular treatment fluid into which they are included maintains the appropriate viscosity.

Suitable gelling agents may include, but are not limited to, polysaccharides, biopolymers, and/or derivatives thereof that contain one or more of these monosaccharide units: galactose, amylose, mannose, glucoside, glycosaminoglycan, glucose, xylose, arabinose, fructose, glucuronic acid, pyranosyl sulfate, and any combination thereof. Specific examples of suitable polysaccharides may include, but are not limited to, a guar gum (e.g., hydroxyethyl guar, hydroxypropyl guar, carboxymethyl guar, carboxymethylhydroxyethyl guar, carboxymethylhydroxypropyl guar, and the like), a cellulose derivative (e.g., hydroxyethyl cellulose, carboxyethylcellulose, carboxymethylcellulose, carboxymethylhydroxyethylcellulose, and the like), xanthan, scleroglucan, succinoglycan, diutan, and any combination thereof.

Examples of suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamide and methacrylamidoalkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, any derivatives thereof, and any combination thereof.

In certain embodiments, the gelling agent may comprise an acrylamide/2-(methacryloyloxy)ethyltrimethylammonium methyl sulfate copolymer. In other certain embodiments, the gelling agent may comprise an acrylamide/2-(methacryloyloxy)ethyltrimethylammonium chloride copolymer. In yet other embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

One or more biocides may be included in any of the treatment fluid compositions described herein to treat the treatment fluid against bacterial contamination proactively or after bacterial contamination is detected. Examples of suitable biocides may include, but are not limited to, sodium hypochlorite, hypochlorous acid, chlorine, bromine, chlorine dioxide, hydrogen peroxide, an aldehyde, a quaternary amine, an isothizaoline, a carbamate, a phosphonium quaternary compound, a halogenated compound, 2-bromo-2-nitro-1,3-propanediol, 2,2 Dibromo-3-nitrilopropionamide, 2-Monobromo-3-nitrilopropionamide, and any combination thereof. Examples of commercially available suitable biocides may include, but are not limited to, BE-6™ and BE-3S™ biocides, available from Halliburton Energy Services, Inc.

The biocide may be included in the treatment fluid in an amount to achieve the desired bacterial contamination protection, and depends, for example, on the type of biocide selected, pH, the subterranean formation conditions (e.g., temperature), and the like, and any combination thereof. Generally, the biocide may be present in the range of from about 2 parts per million (ppm) to about 100000 ppm by weight of the liquid portion of the aqueous base fluid, encompassing any value and subset therebetween.

Any of the treatment fluids described herein may comprise a gel stabilizer to increase the viscous stability of the treatment fluids (e.g., increasing stability over certain temperature ranges). Examples of suitable gel stabilizers may include, but are not limited to, erythorbic acid, ascorbic acid, isoascorbic acid, alkali metal salts thereof, and any combination thereof. Alternatively or additionally, other gel stabilizers may include, but are not limited to, a sodium thiosulphate, an ascorbic acid, an isopropylhydroxylamine, a diethylhydroxylamine, a tert-butylhydroxylamine, a phenylhydroxylamine, a cyclohexylhydroxylamine, a benzylhydroxylamine, and any combination thereof. In any embodiment, the gel stabilizer may be present in an amount in the range of about 0.05% to about 3% by weight of the liquid portion of the aqueous base fluid, encompassing any value and subset therebetween.

Additives other than those mentioned above may additionally be included in the treatment fluids described herein, provided that they do not adversely interfere with the viscosity and breakability of the treatment fluid (e.g., do not interfere with the HPSP), without departing from the scope of the present disclosure. Examples of such additives may include, but are not limited to, a salt, a weighting agent, an inert solid, a fluid loss control agent, an emulsifier, a dispersion aid, a corrosion inhibitor, an emulsion thinner, a nonemulsifier (e.g., LOSURF-259™ nonemulsifier, available from Halliburton Energy Services, Inc.), an emulsion thickener, a surfactant, a lost circulation material, a foaming agent, a gas, a pH control additive, a chelating agent, a scale inhibitor, a gas hydrate inhibitor, a mutual solvent, an oxidizer, a reducer, a friction reducer (e.g., FR-66™ and PERMVIS™ VFR-10 friction reducers, available from Halliburton Energy Services, Inc.), a clay stabilizing agent (e.g., CLA-WEB™, CLAYFIX II™, and CLAYFIX I™ clay stabilizers available from Halliburton Energy Services, Inc.), and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation, unless otherwise indicated.

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid or a portion thereof may, in some embodiments, flow back to wellhead 14 and exit subterranean formation 18. In some embodiments, the treatment fluid that has flowed back to wellhead 14 may subsequently be recovered and recirculated to subterranean formation 18, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A

A treatment fluid comprising: an aqueous base fluid; a first gelling agent selected from the group consisting of hydroxypropyl starch phosphate, a hydroxypropyl starch phosphate derivative, and any combination thereof, and wherein the first gelling agent is present in an amount of about 0.001% to about 20% by weight of a liquid portion of the aqueous base fluid.

Embodiment B

A method comprising: introducing a treatment fluid into a wellbore in a subterranean formation, wherein the treatment fluid comprises an aqueous base fluid and a first gelling agent selected from the group consisting of hydroxypropyl starch phosphate, a hydroxypropyl starch phosphate derivative, and any combination thereof, and wherein the first gelling agent is present in an amount of about 0.001% to about 20% by weight of a liquid portion of the aqueous base fluid; and performing a downhole operation.

Embodiment C

A system comprising: a tubular extending into a wellbore in a subterranean formation; and a pump fluidly coupled to the tubular, the tubular containing a treatment fluid comprising an aqueous base fluid and a first gelling agent selected from the group consisting of hydroxypropyl starch phosphate, a hydroxypropyl starch phosphate derivative, and any combination thereof, and wherein the first gelling agent is present in an amount of about 0.001% to about 20% by weight of a liquid portion of the aqueous base fluid.

Each of Embodiments A, B, and C may have one or more of the following additional elements in any combination:

Element 1: Wherein the treatment fluid breaks at a temperature of greater than about 115° C.

Element 2: Wherein the treatment fluid further comprises a breaker, and wherein the treatment fluid comprising the breaker breaks at a temperature of less than about 115° C.

Element 3: Wherein the treatment fluid further comprises a breaker selected from the group consisting of an oxidative breaker, an acid breaker, a delayed release acid breaker, a delayed release enzyme breaker, a temperature activated breaker, a hydrolysable ester breaker, any encapsulated in an encapsulating material, and any combination thereof.

Element 4: Wherein the treatment fluid further comprises proppant.

Element 5: Wherein the aqueous base fluid comprises a salt concentration of about 0.01% to about 35% by weight of a liquid portion of the aqueous base fluid.

Element 6: Wherein the first gelling agent is pre-cross-linked.

Element 7: Wherein the first gelling agent forms a graft copolymer with at least one first ethylenically unsaturated monomer and at least one second ethylenically unsaturated monomer.

Element 8: Wherein the hydroxypropyl starch phosphate derivative is derivatized with at least one chromophoric group.

Element 9: Wherein the treatment fluid further comprises a second gelling agent that is different than the first gelling agent.

By way of non-limiting example, exemplary combinations applicable to A, B, and/or C include: 1-9; 1, 3, and 8; 2 and 7; 3, 4, 7, and 9; 5 and 6; 2, 3, and 8; 6 and 7; and the like.

To facilitate a better understanding of the embodiments of the present disclosure, the following examples of preferred or representative embodiments are given. In no way should the following examples be read to limit, or to define, the scope of the invention.

EXAMPLE 1

Figure 2:
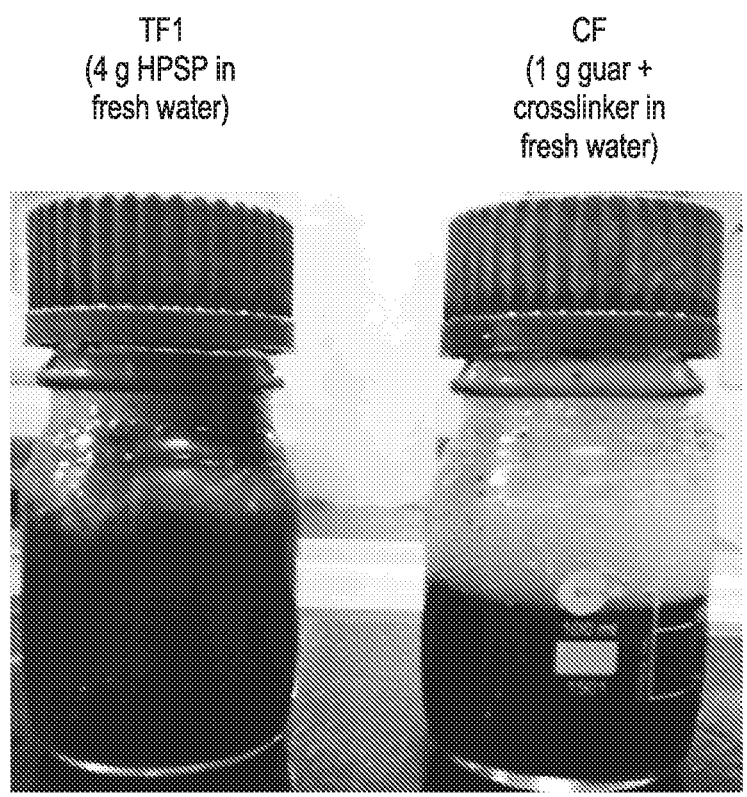
FIG. 2 is an image of the fluid stability of a treatment fluid prepared according to one or more embodiments of the present disclosure.

In this example, the fluid stability of a treatment fluid formed according to one embodiments of the present disclosure was observed at 82.2° C. (180° F.). A control fluid (CF) was prepared using traditional gelling agents only, comprising 1 gram of a guar gelling agent and 0.05 milliliters (mL) of a sodium borate crosslinker in 100 mL of a fresh water aqueous base fluid. The CF was compared to a treatment fluid (TF1), comprising 4 grams of HPSP in 100 mL of a fresh water aqueous base fluid. Both the CF and the TF1 each include 6 pounds per gallon (ppg) high density ceramic (HSP) proppant particulates. The fluid stability of the CF and the TF1 was visually observed in a glass vial. After 30 minutes at 82.2° C., proppant settlement was visually evaluated. As shown in FIG. 2, proppant settlement was evident in the CF, but no visual proppant settlement was observed in the TF1. Accordingly, the TF1 is stable even without the inclusion of a crosslinker.

EXAMPLE 2

Figure 3:
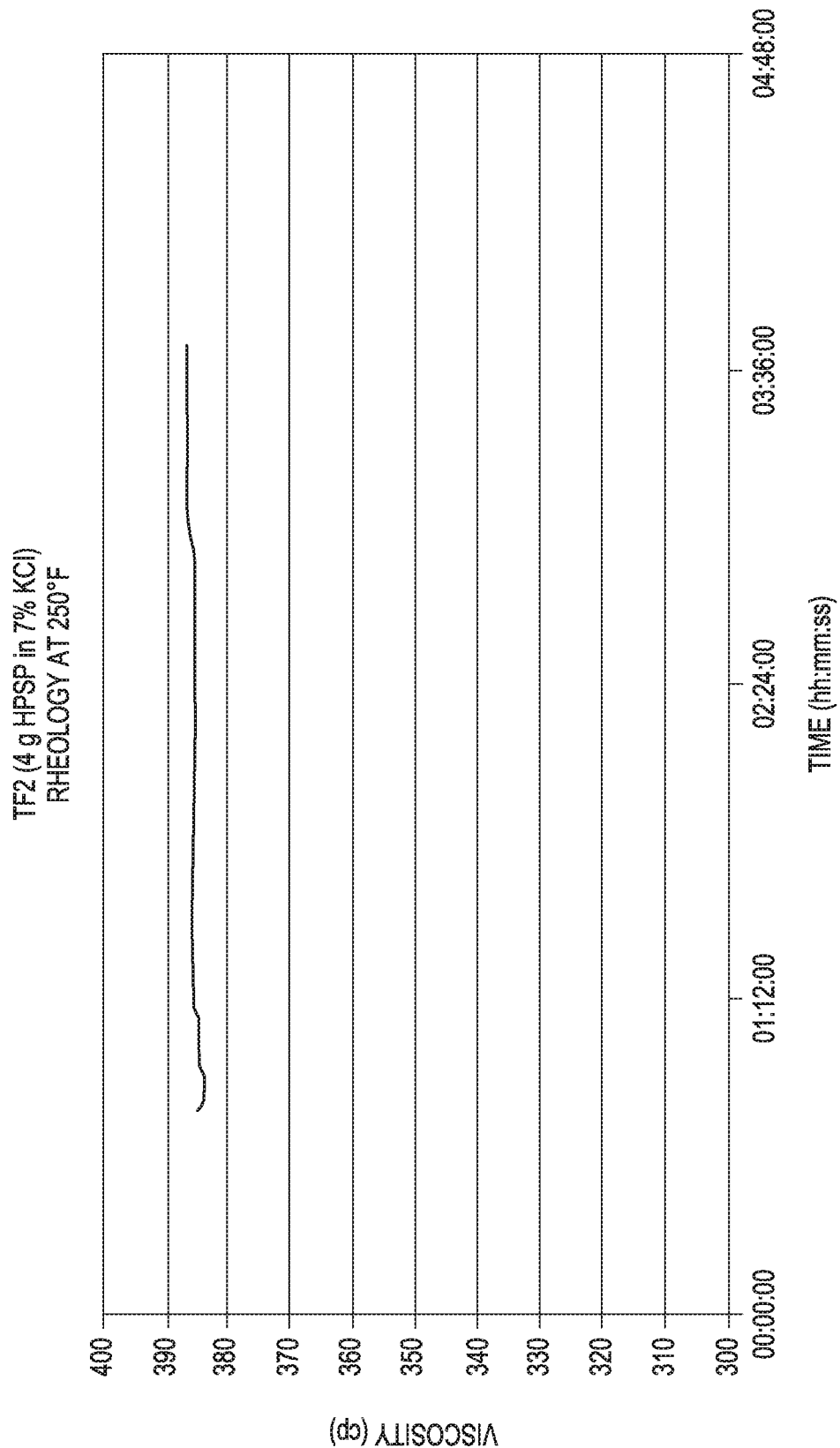
FIGS. 3-4 are graphs of rheology data for various treatment fluids prepared according to one or more embodiments of the present disclosure at 121.1° C. (250° F.).
Figure 4:
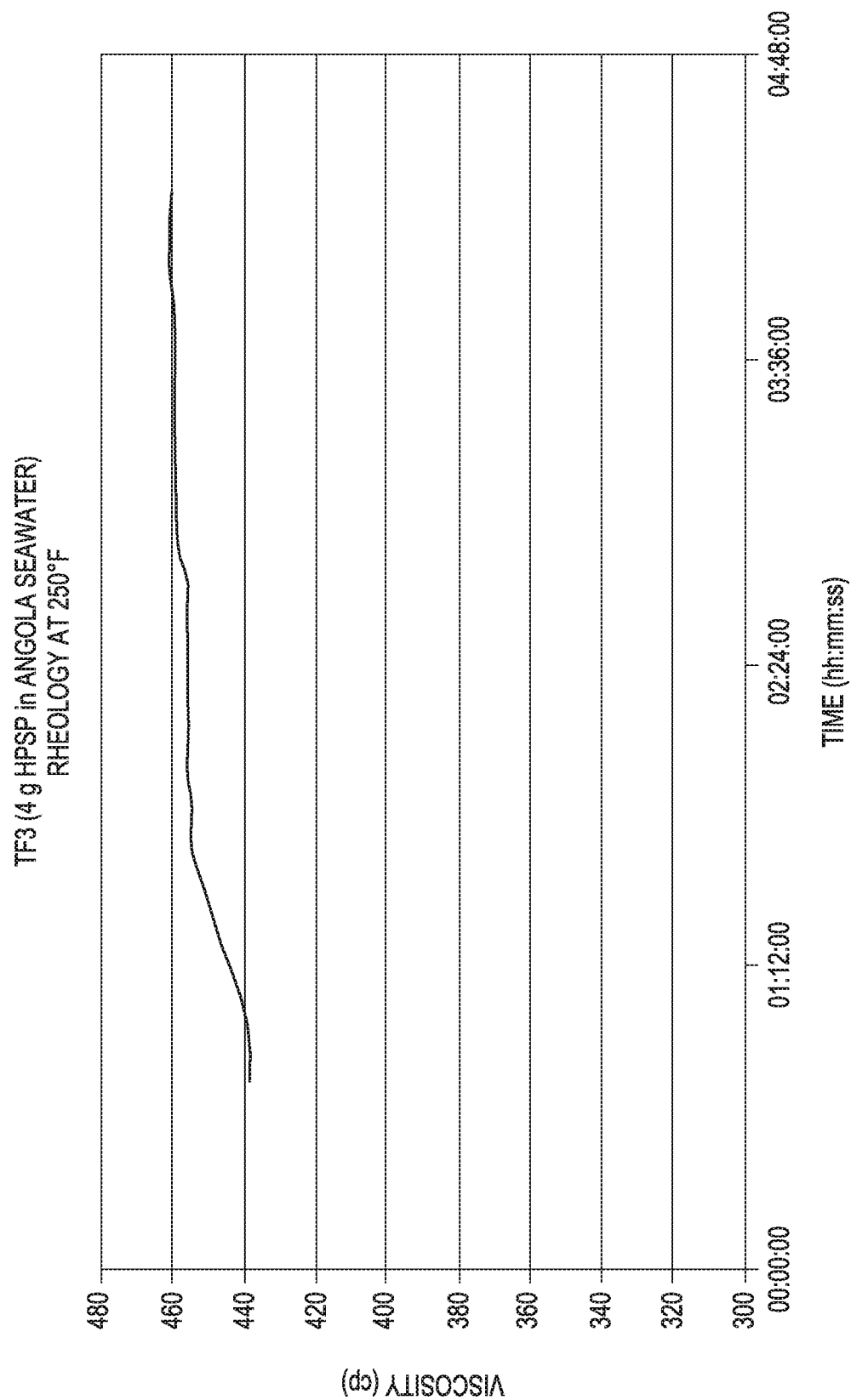

In this example, two treatment fluids (TF2, TF3) were prepared at room temperature with two different types of aqueous base fluid and rheologically tested at 121.1° C. (250° F.) and at a pressure of 500 pounds per inch (psi). TF2 was prepared with 4 grams of HPSP in a 7% KCl fresh water aqueous base fluid; TF3 was prepared with 4 grams of HPSP in an Angola Seawater aqueous base fluid. Angola Seawater comprises about 324 ppm calcium ions and about 970 ppm magnesium ions. Each fluid was held at 250° F. and tested for viscosity over time. The test results of TF2 are shown in FIG. 3 and the test results of TF3 are shown in FIG. 4. As shown, both TF2 and TF3 exhibited a viscosity of greater than 380 cP over a prolonged period of time, these results were achieved in the absence of a crosslinker. TF2 exhibited a viscosity of about 385 cP, and TF3 exhibited a viscosity of about 460 cP. In fact, TF3 comprising the Angola Seawater aqueous base fluid exhibited an increased viscosity compared to TF2 comprising the 7% KCl aqueous base fluid, thus demonstrating that the treatment fluids described herein are suitable for use with brine base fluids, and with base fluids such as seawater base fluid.

EXAMPLE 3

Figure 5:
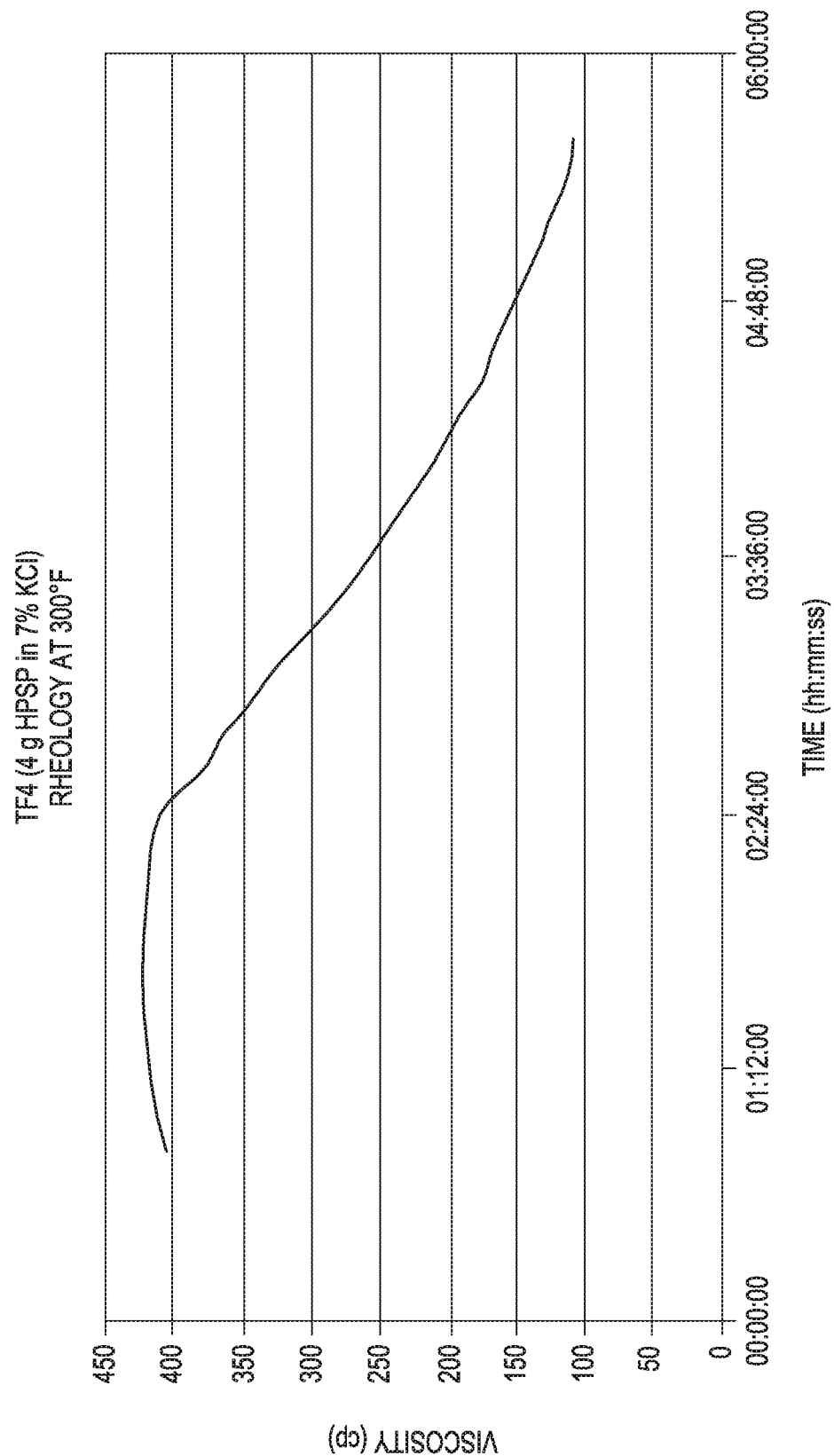
FIGS. 5-6 are graphs of rheology data for various treatment fluids prepared according to one or more embodiments of the present disclosure at 148.9° C. (300° F.).
Figure 6:
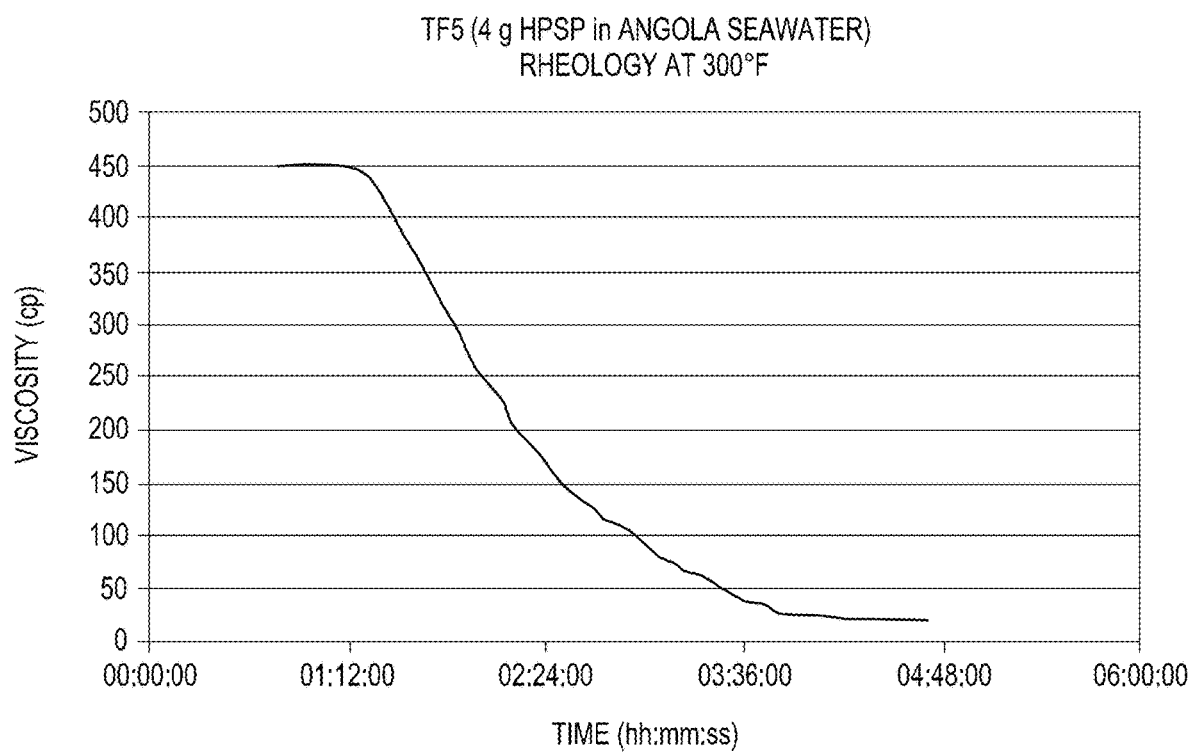

In this example, two treatment fluids (TF4, TF5) were prepared at room temperature with two different types of aqueous base fluid and rheologically tested at 148.9° C. (300° F.) and at a pressure of 500 psi. TF4 was prepared with 4 grams of HPSP in a 7% KCl fresh water aqueous base fluid; TF5 was prepared with 4 grams of HPSP in Angola Seawater aqueous base fluid, as previously described in Example 2. Each fluid was held at 300° F. and tested for viscosity over time. The test results of FT4 are shown in FIG. 5 and the test results of TF5 are shown in FIG. 6. No breaker was used. As shown, both treatment fluids exhibited a viscosity of greater than 400 cP for at least about an hour and thereafter, depending on the treatment fluid composition, both self-broke. TF4 maintained a viscosity of about 425 cP and then began to self-break after about 2.4 hours; TF5 maintained a viscosity of about 460 cP and then began to self-break after about 1.2 hours. As shown, TF5 obtained a viscosity indicating that it was broken after about 3.3 hours. Although not tested, after a period of time greater than the approximate 5 hours tested of TF4, it too would have obtained a viscosity indicating that it was broken. It is notable that the self-breaking time of TF4 compared to TF5 is longer. This may be at least attributable to the salt concentration in the Angola Seawater, which allowed TF5 to reach an initial high viscosity and the break faster at the same temperature than TF4 due to chelation of the phosphate functionality of the HPSP at a faster rate.

Figure 7A:
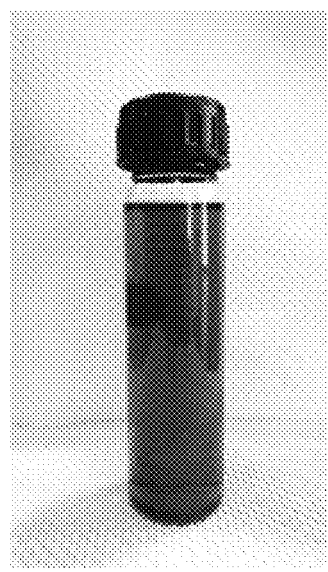
FIGS. 7A-7B is an image of a treatment fluid prepared according to one or more embodiments of the present disclosure after it has broken.
Figure 7B:

Accordingly, a subterranean formation operation (e.g., a proppant placement operation) could be performed in a subterranean formation with the treatment fluids described herein having a sufficient suspension viscosity, followed by their subsequent breaking without the addition of a breaker or any wellbore intervention. Thus, this example supports the use of the treatment fluids described herein in similar temperature wellbores. The broken fluid was visually observed and did not exhibit visible residue, thus supporting the use of the treatment fluid without resultant formation damage due to residual gelling agent, particularly in low-permeability wellbores, as shown in FIG. 7A for TF4 and FIG. 7B for TF5. Further, optimization of the treatment fluids at various wellbore temperatures could additionally improve the performance of the treatment fluid, thereby even further reducing gelling agent residue.

EXAMPLE 4

Figure 8:
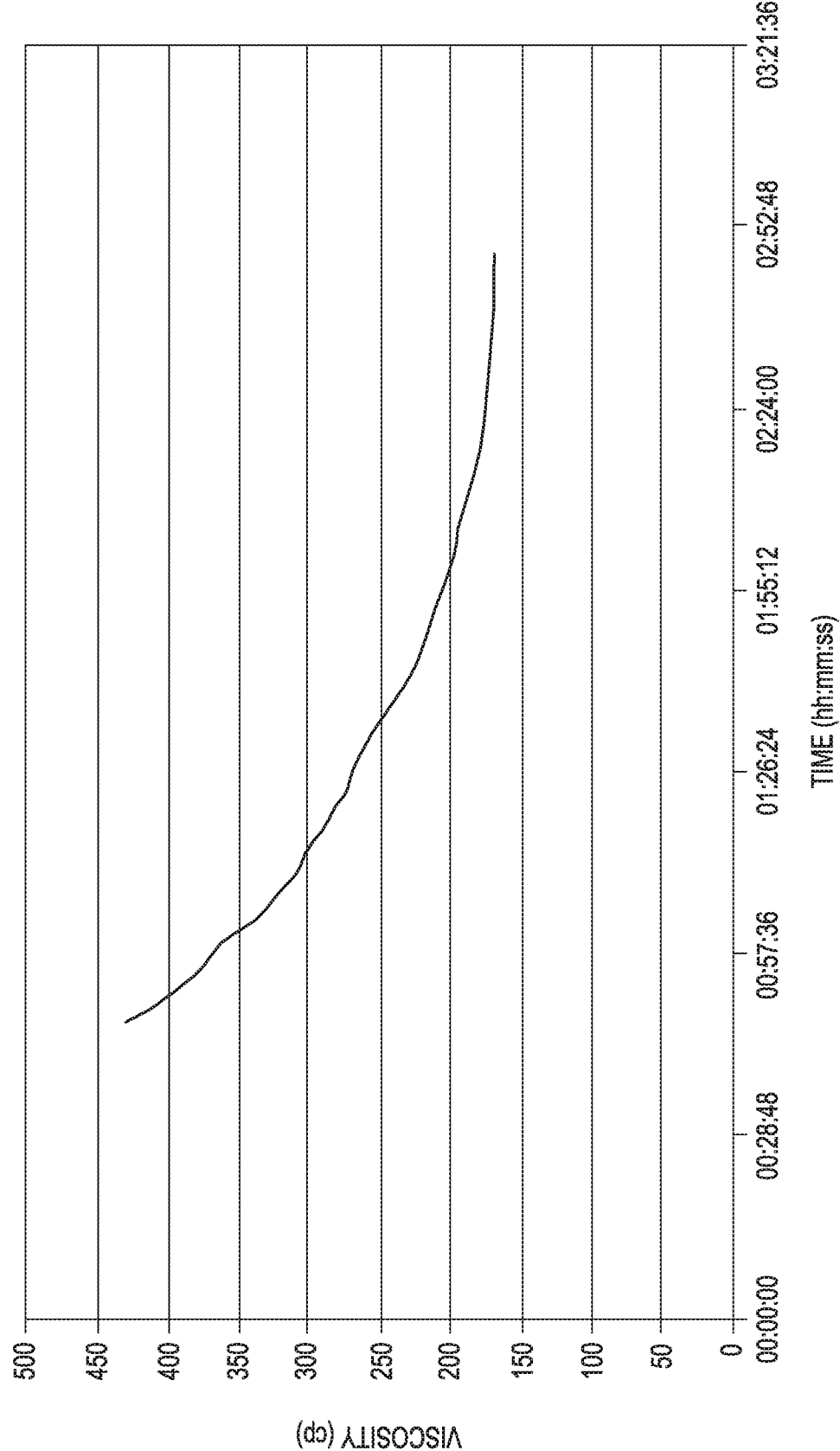
FIGS. 8-9 are graphs of rheology data for various treatment fluids prepared according to one or more embodiments of the present disclosure at 121.1° C. (250° F.).
Figure 9:
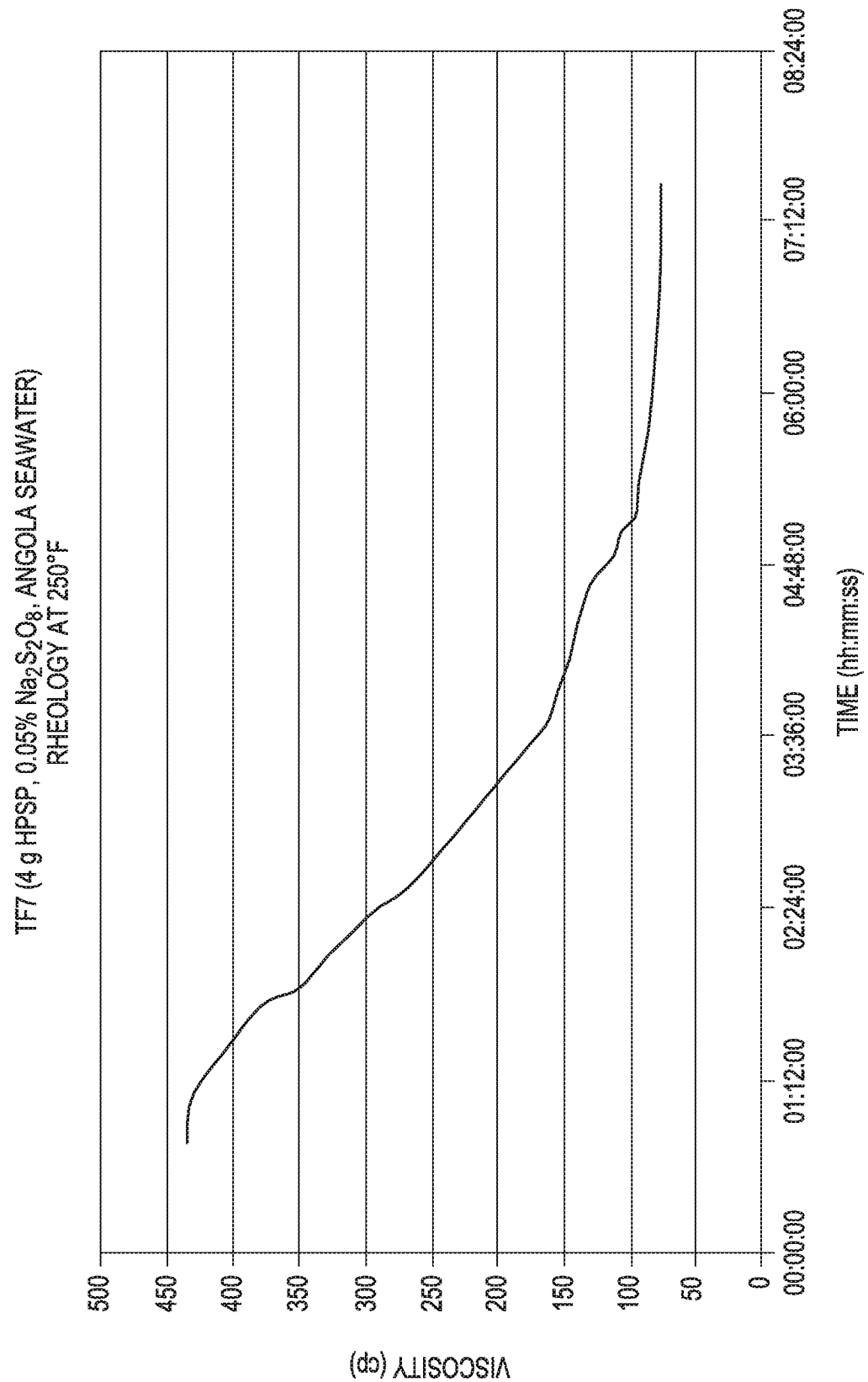

In this example, two treatment fluids (TF6, TF7) were prepared with two different types of aqueous base fluid and a breaker and rheologically tested at 121.1° C. (250° F.) and at a pressure of 500 psi. TF6 was prepared with 4 grams of HPSP and 0.05% by weight per volume of an ammonium persulfate $((NH_4)_2S_2O_8)$ oxidative breaker in an Angola Seawater aqueous base fluid; TF7 was prepared with 4 grams of HPSP and 0.05% by weight per volume of an sodium persulfate $(Na_2S_2O_8)$ oxidative breaker in an Angola Seawater aqueous base fluid. The rheology results of TF6 are shown in FIG. 8 and the rheology results of TF7 are shown in FIG. 9. As shown, TF6 and TF7 began to break at approximately the same times at 55 minutes and 65 minutes, respectively. Accordingly, the treatment fluids described herein break at a reduced temperature when a breaker is included, as compared to Example 2, which can be harnessed as needed for a particular subterranean formation operation.

EXAMPLE 5

Figure 10:
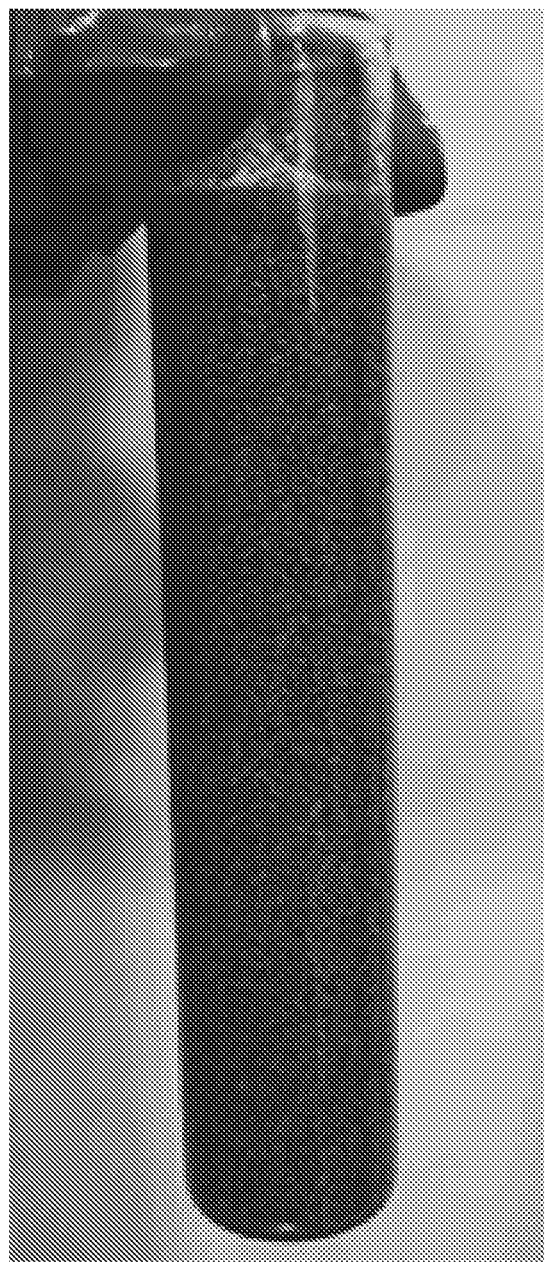
FIG. 10 is an image of the proppant suspension of a treatment fluid prepared according to one or more embodiments of the present.

In this example, proppant suspension was evaluated in the treatment fluids described herein having various salt concentration aqueous base fluids. Three treatment fluids were compared using 4 grams of HPSP in (1) a 20% calcium chloride (bivalent) fresh water aqueous base fluid (TF8), (2) an Angola Seawater aqueous base fluid as described above (TF9), or (3) a Saudi Seawater aqueous base fluid comprising about 673 calcium ions and about 1958 ppm magnesium ions (TF10). Each of the TF8, TF9, and TF10 included 6 ppg of CARBOLITE® ceramic proppant particulates. Visual observation of the three treatment fluids demonstrated that increased proppant suspension was achieved in TF8 compared to both TF9 and TF10, indicating increased suspension in the presence of bivalent salt concentration. Accordingly, raw seawater is an effective aqueous base fluid for use in the embodiments of the present disclosure, among the other aqueous base fluids described herein, even during interaction of the treatment fluid with formation water. The proppant suspension of TF8 is shown in FIG. 10 is after 1 hour at 280° F. (137.8° C.).

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    introducing a treatment fluid into a wellbore in a subterranean formation, wherein the treatment fluid comprises an aqueous base fluid and a first gelling agent selected from the group consisting of hydroxypropyl starch phosphate, a hydroxypropyl starch phosphate derivative, and any combination thereof, and wherein the first gelling agent is present in an amount of about 0.001% to about 20% by weight of a liquid portion of the aqueous base fluid,
    wherein the first gelling agent forms a graft copolymer with at least one first ethylenically unsaturated monomer and at least one second ethylenically unsaturated monomer; and
    performing a downhole operation.

2. The method of claim 1, further comprising breaking the treatment fluid in the wellbore at a wellbore temperature of about 115° C. to about 240° C.

3. The method of claim 1, wherein the treatment fluid comprises a breaker selected from the group consisting of an oxidative breaker, an acid breaker, a delayed release acid breaker, a delayed release enzyme breaker, a temperature activated breaker, a hydrolysable ester breaker, an encapsulated breaker in an encapsulating material, and any combination thereof.

4. The method of claim 1, wherein the treatment fluid further comprises proppant.

5. The method of claim 1, wherein the aqueous base fluid comprises a salt concentration of about 0.01% to about 35% by weight of a liquid portion of the aqueous base fluid.

6. The method of claim 1, wherein the first gelling agent is pre-crosslinked.

7. The method of claim 1, wherein the hydroxypropyl starch phosphate derivative is derivatized with at least one chromophoric group.

8. The method of claim 1, wherein the treatment fluid further comprises a second gelling agent that is different than the first gelling agent.

9. A method comprising:
    introducing a treatment fluid into a wellbore in a subterranean formation, wherein the treatment fluid comprises an aqueous base fluid and a first gelling agent selected from the group consisting of hydroxypropyl starch phosphate, a hydroxypropyl starch phosphate derivative, and any combination thereof, and wherein the first gelling agent is present in an amount of about 0.001% to about 20% by weight of a liquid portion of the aqueous base fluid,
    wherein the hydroxypropyl starch phosphate derivative is derivatized with at least one chromophoric group; and
    performing a downhole operation.

10. The method of claim 9, further comprising breaking the treatment fluid in the wellbore at a wellbore temperature of about 115° C. to about 240° C.

11. The method of claim 9, wherein the treatment fluid comprises a breaker selected from the group consisting of an oxidative breaker, an acid breaker, a delayed release acid breaker, a delayed release enzyme breaker, a temperature activated breaker, a hydrolysable ester breaker, an encapsulated breaker in an encapsulating material, and any combination thereof.

12. The method of claim 9, wherein the treatment fluid further comprises proppant.

13. The method of claim 9, wherein the aqueous base fluid comprises a salt concentration of about 0.01% to about 35% by weight of a liquid portion of the aqueous base fluid.

14. The method of claim 9, wherein the first gelling agent is pre-crosslinked.

15. The method of claim 9, wherein the first gelling agent forms a graft copolymer with at least one first ethylenically unsaturated monomer and at least one second ethylenically unsaturated monomer.

16. The method of claim 9, wherein the treatment fluid further comprises a second gelling agent that is different than the first gelling agent.

17. A system comprising:
    a tubular extending into a wellbore in a subterranean formation; and
    a pump fluidly coupled to the tubular, the tubular containing a treatment fluid comprising an aqueous base fluid and a first gelling agent selected from the group consisting of hydroxypropyl starch phosphate, a hydroxypropyl starch phosphate derivative, and any combination thereof, and wherein the first gelling agent is present in an amount of about 0.001% to about 20% by weight of a liquid portion of the aqueous base fluid, wherein the first gelling agent forms a graft copolymer with at least one first ethylenically unsaturated monomer and at least one second ethylenically unsaturated monomer.

\* \* \* \* \*